United States Patent
Chen

(10) Patent No.: US 12,067,286 B2
(45) Date of Patent: Aug. 20, 2024

(54) DATA PROCESSING METHOD FOR EFFICIENTLY PROCESSING DATA STORED IN THE MEMORY DEVICE BY SPLITTING DATA FLOW AND THE ASSOCIATED DATA STORAGE DEVICE

(71) Applicant: Silicon Motion, Inc., Hsinchu County (TW)

(72) Inventor: Yu-Ta Chen, Keelung (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/204,386

(22) Filed: May 31, 2023

(65) Prior Publication Data

US 2024/0103757 A1 Mar. 28, 2024

(30) Foreign Application Priority Data

Sep. 26, 2022 (TW) .................................. 111136350

(51) Int. Cl.
*G06F 3/06* (2006.01)
(52) U.S. Cl.
CPC .......... *G06F 3/0656* (2013.01); *G06F 3/0604* (2013.01); *G06F 3/0659* (2013.01); *G06F 3/0679* (2013.01)
(58) Field of Classification Search
CPC .... G06F 3/0656; G06F 3/0604; G06F 3/0659; G06F 3/0679; G06F 3/061
USPC .................................................. 711/154, 100
See application file for complete search history.

(56) References Cited

U.S. PATENT DOCUMENTS

| 2005/0144358 A1* | 6/2005 | Conley ............... G06F 12/0246 711/E12.008 |
| 2019/0303299 A1* | 10/2019 | Su ......................... G06F 3/0679 |
| 2022/0012174 A1 | 1/2022 | Seok |
| 2023/0097344 A1* | 3/2023 | Greathouse ............. G06F 3/064 711/154 |

FOREIGN PATENT DOCUMENTS

| CN | 104956311 B | 10/2017 |
| CN | 112905495 A | 6/2021 |
| TW | 202125268 A | 7/2021 |
| TW | 202203031 A | 1/2022 |

* cited by examiner

*Primary Examiner* — David Yi
*Assistant Examiner* — Zubair Ahmed
(74) *Attorney, Agent, or Firm* — Winston Hsu

(57) ABSTRACT

A data storage device includes a memory device and a memory controller. The memory controller uses a first predetermined memory block as a buffer to receive data from a host device. In response to a write command received from the host device, the memory controller determines a sub-region corresponding to the write command, determines whether the sub-region is a system data sub-region and accordingly determines whether to use a second predetermined memory block as another buffer to receive data from the host device. When the memory controller determines that the sub-region corresponding to the write command is a system data sub-region, the memory controller writes the data into the second predetermined memory block. When the memory controller determines that the sub-region corresponding to the write command is not a system data sub-region, the memory controller writes the data into the first predetermined memory block.

14 Claims, 6 Drawing Sheets

DATA PROCESSING METHOD FOR EFFICIENTLY PROCESSING DATA STORED IN THE MEMORY DEVICE BY SPLITTING DATA FLOW AND THE ASSOCIATED DATA STORAGE DEVICE

BACKGROUND OF THE INVENTION

1. Field of the Invention

The invention relates to a data storage device and a data processing method capable of efficiently processing data stored in the memory device and improving the access performance of the memory device.

2. Description of the Prior Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, efficient control of access to these data storage devices is an important issue.

In order to improve the access performance of the data storage device, a novel data processing method which is capable of efficiently processing data stored in the memory device and improving the access performance of the memory device, is proposed.

SUMMARY OF THE INVENTION

According to an embodiment of the invention, a data storage device comprises a memory device and a memory controller. The memory device comprises a plurality of memory blocks. The memory blocks correspond to a plurality of logical units. Each logical unit corresponds to a plurality of logical addresses. The logical addresses corresponding to each logical unit are divided into a plurality of regions. Each region is further divided into a plurality of sub-regions and the sub-regions comprise one or more system data sub-regions. The memory controller is coupled to the memory device and configured to access the memory device. The memory controller uses a first predetermined memory block as a buffer to receive data from a host device. In response to a write command received from the host device to write data corresponding to one or more logical addresses into the memory device, the memory controller determines a sub-region corresponding to the write command according to the one or more logical addresses, determines whether the sub-region is one of the one or more system data sub-regions and accordingly determines whether to use a second predetermined memory block as another buffer to receive the data from the host device. When the memory controller determines that the sub-region corresponding to the write command is one of the one or more system data sub-regions, the memory controller determines to use the second predetermined memory block as said another buffer and writes the data corresponding to the one or more logical addresses into the second predetermined memory block, and when the memory controller determines that the sub-region corresponding to the write command is not one of the one or more system data sub-regions, the memory controller writes the data corresponding to the one or more logical addresses into the first predetermined memory block.

According to an embodiment of the invention, a data processing method for a data storage device comprising a memory device and a memory controller, wherein the memory device comprises a plurality of memory blocks, the memory blocks correspond to a plurality of logical units, each logical unit corresponds to a plurality of logical addresses, the logical addresses corresponding to each logical unit are divided into a plurality of regions and each region is further divided into a plurality of sub-regions, the sub-regions comprise one or more system data sub-regions, the memory controller is coupled to the memory device and configured to access the memory device, the memory controller uses a first predetermined memory block as a buffer to receive data from a host device and the data processing method is performed by the memory controller and comprises: in response to a write command received from the host device to write data corresponding to one or more logical addresses into the memory device, determining a sub-region corresponding to the write command according to the one or more logical addresses; determining whether the sub-region is one of the one or more system data sub-regions and accordingly determining whether to use a second predetermined memory block as another buffer to receive the data from the host device; and using the second predetermined memory block as said another buffer and writing the data corresponding to the one or more logical addresses into the second predetermined memory block when the sub-region corresponding to the write command is determined as one of the one or more system data sub-regions, and writing the data corresponding to the one or more logical addresses into the first predetermined memory block when the sub-region corresponding to the write command is determined not one of the one or more system data sub-regions.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
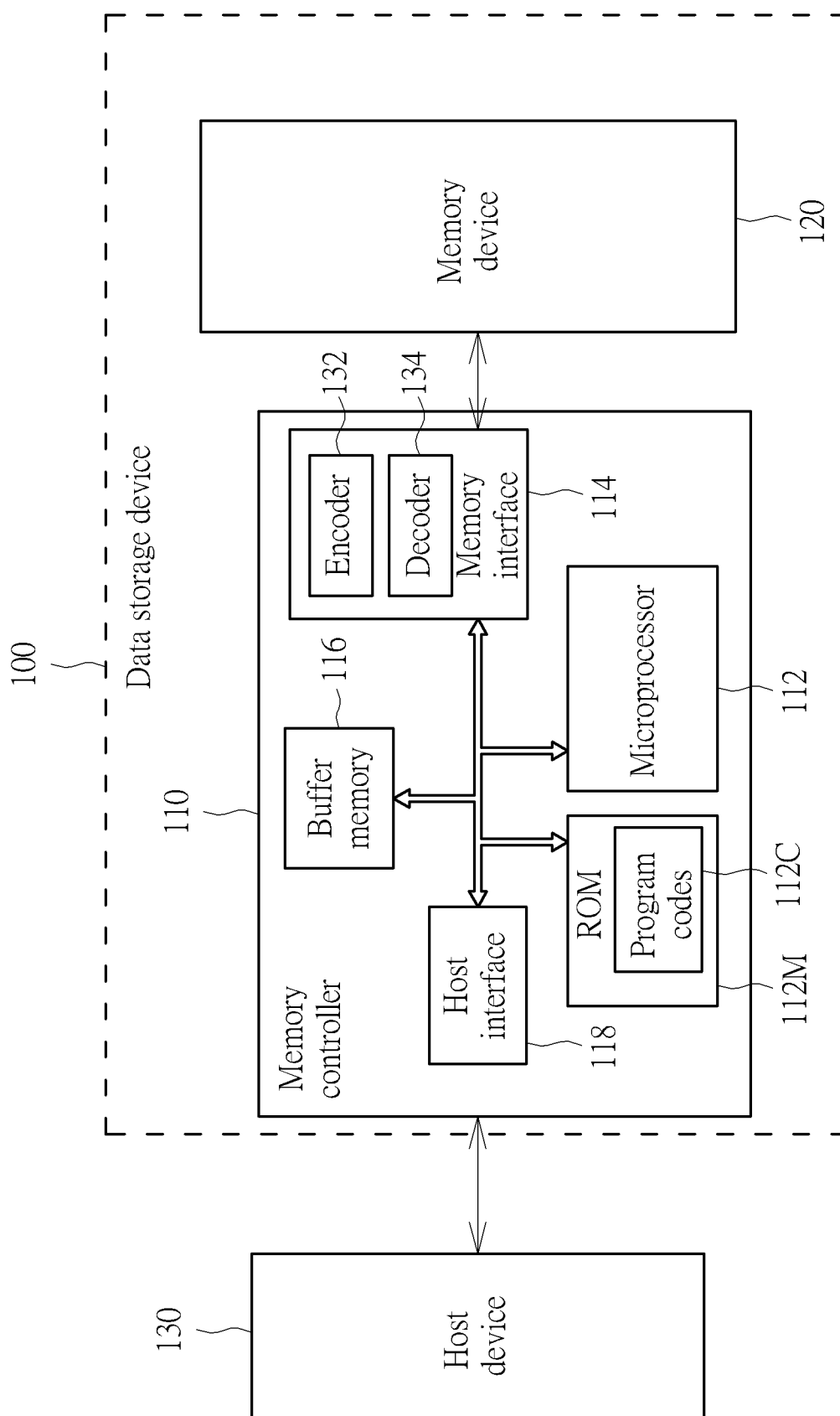
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks, the Triple-Level Cell (TLC) memory blocks, the Quad-Level Cell (QLC), or the likes. The memory cell of the SLC memory block is configured to store one bit of data, the memory cell of the MLC memory block is configured to store two bits of data, the memory cell of the TLC memory block is configured to store three bits of data, the memory cell of the QLC memory block is configured to store four bits of data, and the MLC, TLC and QLC memory blocks may also be referred to as the multiple-level cell memory blocks.

Generally, the memory device 120 may be divided into three regions, comprising a system region, a data region and a spare region. The memory controller 110 is configured to select one or more predetermined memory blocks from the spare region as the cache memories, which may also be called buffers, current blocks or active blocks, to receive data and buffer the data. When a predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC, a TLC or a QLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to a multiple-level cell memory block (the destination memory block) and update the destination memory block as a data block in the data region.

In addition, the memory device 120 may store a global Logical-to-Physical (L2P) (or called Host-to-Flash (H2F)) mapping table, for the memory controller 110 to access data in the memory device 120. The global L2P mapping table may be located in a predetermined region within the memory device 120, such as a system region, but the invention is not limited thereto. The global L2P mapping table may be divided into a plurality of local L2P mapping tables, and the local L2P mapping tables may be stored in the same or different memory elements. For example, one memory element may store one local L2P mapping table. When needed, the memory controller 110 may load at least one portion (e.g., a portion or all) of the global L2P mapping table into the buffer memory 116 or other memories. For example, the memory controller 110 may load a local L2P mapping table to be a temporary L2P mapping table, for the memory controller 110 to access data in the memory device 120 according to local L2P mapping table, but the invention is not limited thereto.

The global or local L2P mapping table (hereinafter collectively called the L2P mapping table) stored in the memory device 120 may comprises a plurality of fields, one field of the L2P mapping table is configured to record mapping information of one logical address, where one logical address may correspond to one logical page. The mapping information of a logical address or a logical page recorded in the L2P mapping table is the logical-to-physical mapping information regarding which physical address of the memory device stores data of the corresponding logical address or logical page.

In an embodiment of the invention, the host device 130 and the data storage device 100 may adopt the HPB (Host Performance Booster) series standards which use a memory at the host device side (such as the DRAM of the host device 130) to temporarily store the mapping information maintained by the UFS device (such as the data storage device 100 implemented in compliance with the UFS standards). The mapping information may be retrieved from the global or local L2P mapping table. With the aid of the mapping information, the host device 130 may issue specific read commands (hereinafter called the HPB READ commands) carrying information regarding physical addresses (such as the physical block addresses (PBAs)), which are carried in the HPB entries, corresponding to logical addresses (such as the logical block addresses (LBAs)) that the host device 130 attempts to read to read data. In this manner, as compared to the normal read command, the memory controller 110 could save the time required to read and load the global or local L2P mapping table from the memory device 120 and save the time to search the physical addresses corresponding to the logical addresses that the host device 130 attempts to read in the loaded L2P mapping table. Therefore, the read performance can be improved.

Figure 2:
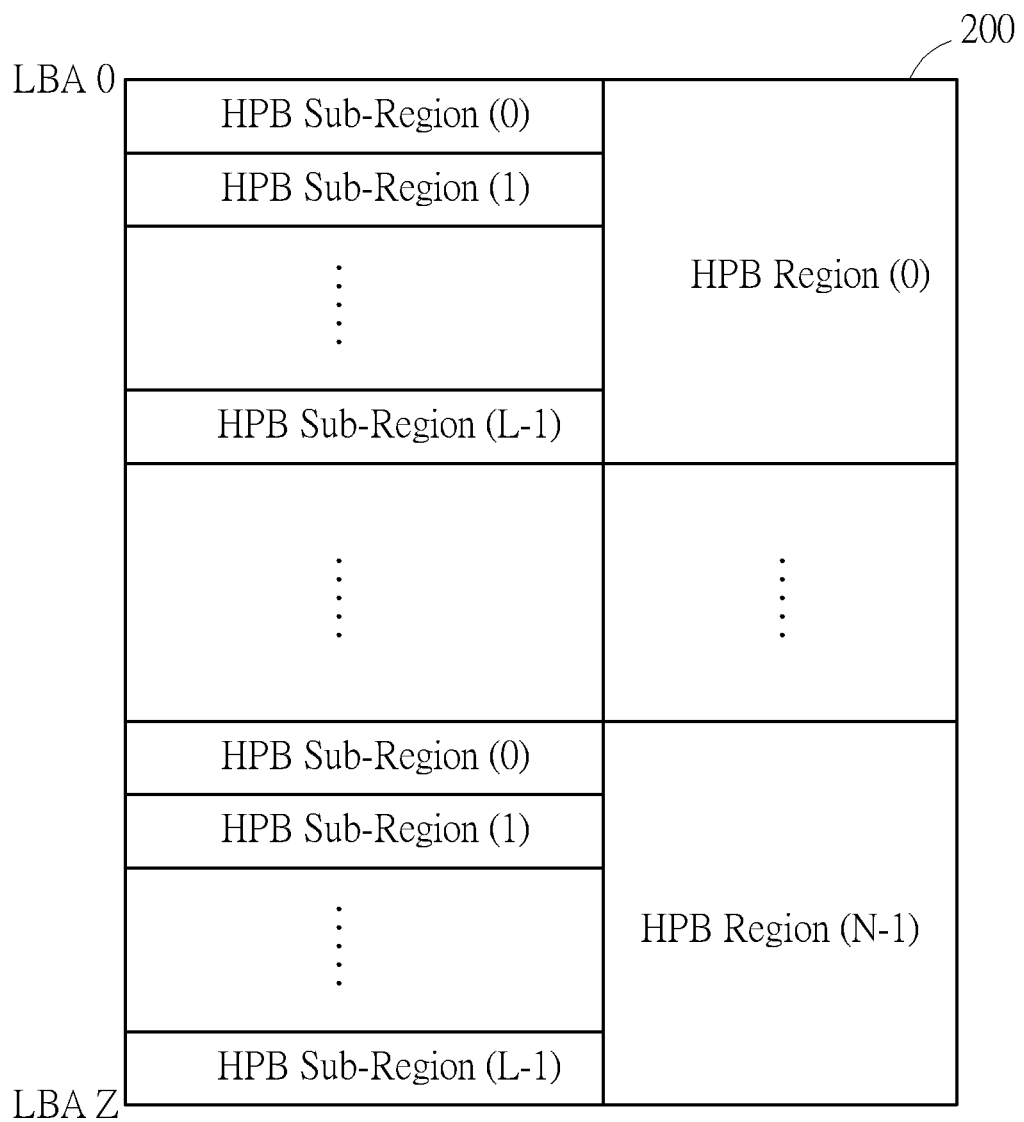
FIG. 2 is a schematic diagram showing an exemplary logical unit and its corresponding LBAs.

In the embodiments of the invention, the memory device 120 may be logically divided into several partitions, each partition may be regarded as a logical unit. Therefore, the memory blocks of the memory device 120 may correspond to a plurality of logical units, and each logical unit may correspond to a plurality of LBAs. FIG. 2 is a schematic diagram showing an exemplary logical unit 200 and its corresponding LBAs. The LBAs (such as the LBAs LBA 0-LBA Z, where Z is a positive integer) corresponding to each logical unit may be divided into a plurality of HPB Regions (such as the HPB Region (0)-HPB Region (N−1), where N is a positive integer and greater than 1), and each HPB Region may be further divided into a plurality of HPB Sub-Regions (such as the HPB Sub-Region (0)-HPB Subs-Region (L−1), where L is a positive integer). The size of one HPB Sub-Region (hereinafter called a Sub-Region for brevity) may be smaller than or equal to the size of one HPB Region (hereinafter called a Region for brevity).

In the embodiments of the invention, there are two modes for obtaining the HPB entries, including the Host control mode and the Device control mode.

Figure 3:
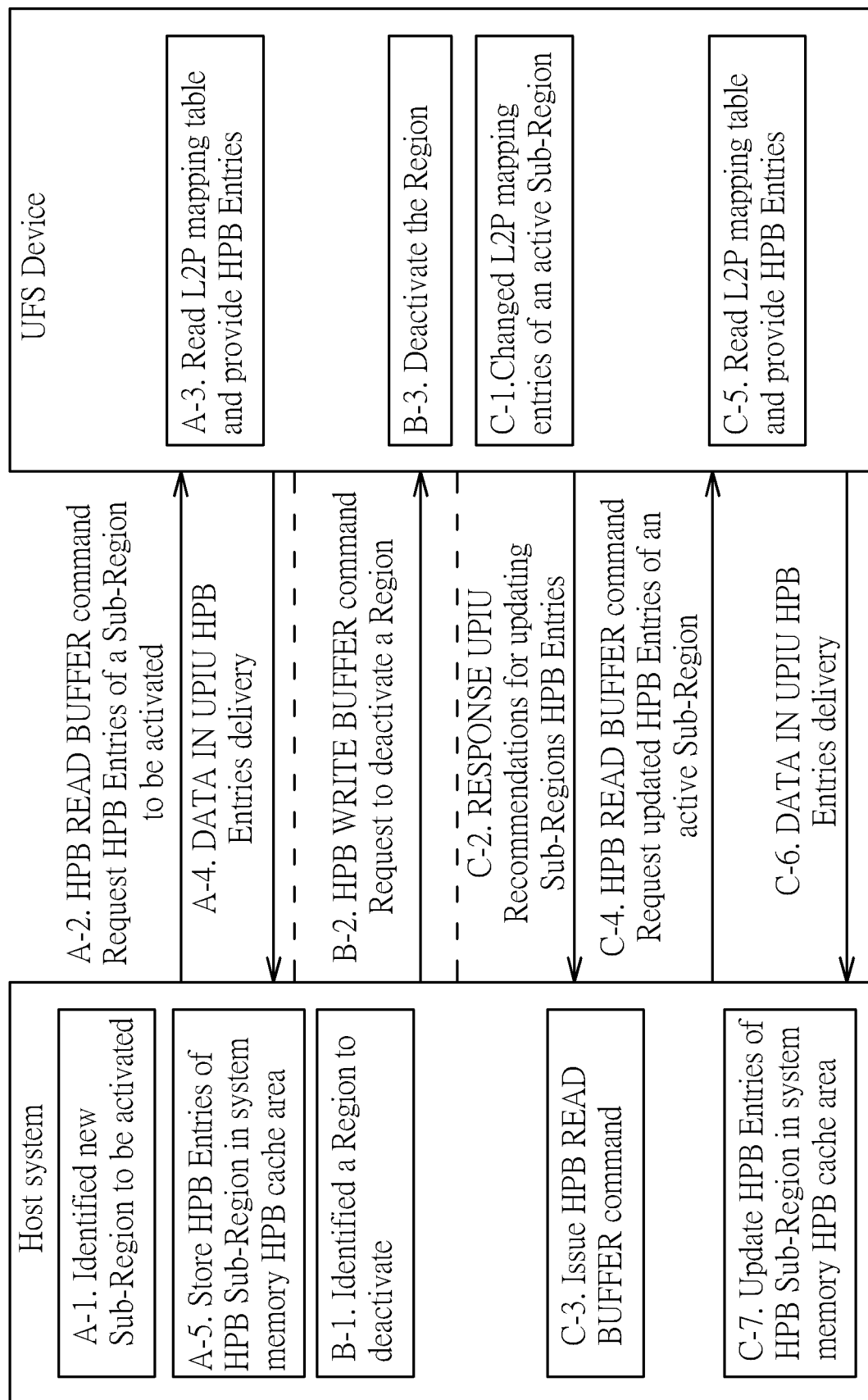
FIG. 3 is a schematic diagram showing operations under the Host control mode.

FIG. 3 is a schematic diagram showing operations under the Host control mode. In the Host control mode, the host system (such as the host device 130) may identify the new Sub-Region to be activated (e.g., the operation A-1) and issue an HPB READ BUFFER command to request the HPB entries of the Sub-Region to be activated (e.g., the operation A-2). In response to reception of the HPB READ BUFFER command, the UFS device (such as the memory controller 110) may read at least a portion of the L2P mapping table (such as the global L2P mapping table or the local L2P mapping table) corresponding to the designated Sub-Region to be activated from the memory device 120 and provide the HPB entries based on the mapping information recorded in the L2P mapping table (e.g., the operation A-3). The UFS device may then deliver the HPB entries via a DATA IN UFS Protocol Information Unit (UPIU) packet to the host system (e.g., the operation A-4). The host system may allocate an HPB area (also referred to as an HPB cache area) in a system memory for storing the HPB entries (e.g., the operation A-5).

The host system may also identify the Region to deactivate (e.g., the operation B-1) and issue an HPB WRITE BUFFER command to request to deactivate a Region (e.g., the operation B-2). In response to reception of the HPB WRITE BUFFER command, the UFS device may deactivate the Region (e.g., the operation B-3).

In addition, when the UFS device determines that update of the HPB entries of any Sub-Region is required, for example, when the UFS device has changed the L2P mapping information (e.g., L2P mapping entries) of an active Sub-Region (e.g., the operation C-1), the UFS device may transmit a RESPONSE UPIU packet to the host system for recommendation for updating Sub-Regions HPB entries (e.g., the operation C-2). The host system may issue an HPB READ BUFFER command in response to reception of the RESPONSE UPIU packet (e.g., the operation C-3) and transmit the HPB READ BUFFER command to the UFS device to request updated HPB entries of an active Sub-Region (e.g., the operation C-4). In response to reception of the HPB READ BUFFER command, the UFS device may read the portion of the L2P mapping table associated with the active Sub-Region and provide the HPB entries based on the mapping information recorded in the L2P mapping table (e.g., the operation C-5). Similarly, the UFS device may deliver the HPB entries via a DATA IN UPIU packet to the host system (e.g., the operation C-6). The host system may update the HPB entries of the HPB Sub-Region stored in the system memory HPB cache area based on the received information (e.g., the operation C-7).

Figure 4:
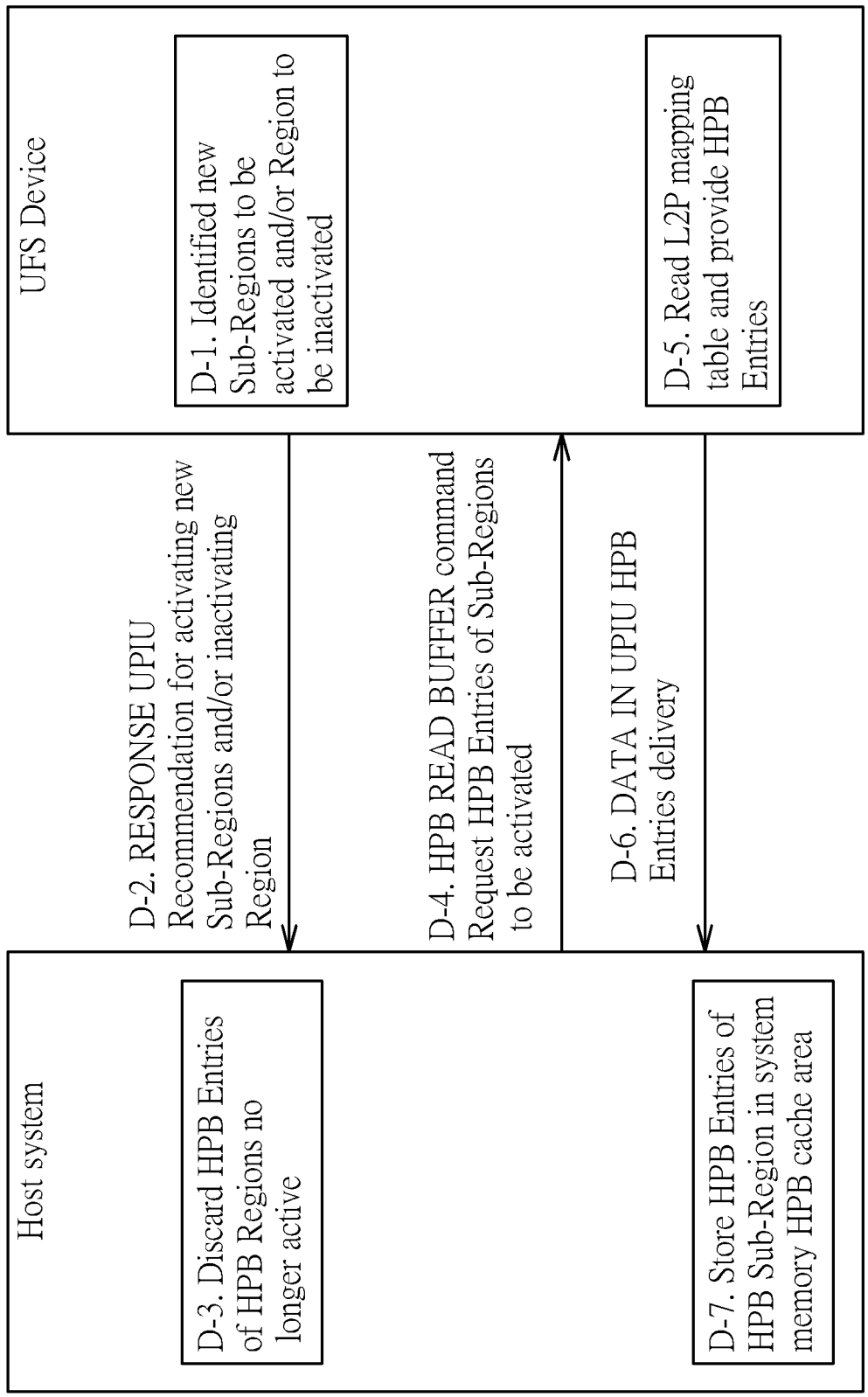
FIG. 4 is a schematic diagram showing operations under the Device control mode.

FIG. 4 is a schematic diagram showing operations under the Device control mode. In the Device control mode, the UFS device may identify the new Sub-Regions to be activated and/or a Region to be inactivated (e.g., the operation D-1) and transmit a RESPONSE UPIU packet to the host system for recommendation for activating the new Sub-Regions and/or inactivating the Region (e.g., the operation D-2). Regarding inactivating the Region, in response to reception of the RESPONSE UPIU packet, the host system may discard the HPB entries of the HPB Regions no longer active (e.g., the operation D-3). Regarding activating the new Sub-Regions, the host system may issue an HPB READ BUFFER command to the UFS device to request the HPB entries of the new Sub-Regions to be activated (e.g., the operation D-4). Similarly, in response to reception of the HPB READ BUFFER command, the UFS device may read at least a portion of the L2P mapping table (such as read the global L2P mapping table or the local L2P mapping table) corresponding to the designated Sub-Region to be activated from the memory device 120 and provide the HPB entries based on the mapping information recorded in the L2P mapping table (e.g., the operation D-5). The UFS device may then deliver the HPB entries via a DATA IN UPIU packet to the host system (e.g., the operation D-6). The host system may allocate an HPB area (also referred to as an HPB cache area) in a system memory for storing the HPB entries (e.g., the operation D-7).

With the aid of the HPB entries, the host device 130 may issue aforementioned specific read commands, such as the HPB READ commands, carrying information regarding a starting logical address that the host device 130 attempts to read, a transfer length and the HPB entry to read data, and the read performance can be improved.

On the other hand, for the managements of the write operation of the memory device and invalid data, the memory controller 110 may also be configured to write the data corresponding to specific HPB Sub-Regions into specific memory blocks. In this manner, the access performance of the memory device may also be improved.

As described above, the memory controller 110 may select one or more predetermined memory blocks from the spare region as the cache memories, which may also be called buffers, current blocks or active blocks, to receive data and buffer the data. When the memory controller 110 selects a predetermined memory block as the buffer to receive data, the memory controller 110 may determine to use an SLC mode or non-SLC mode (e.g., the aforementioned MLC, TLC or QLC mode) to erase the data in the selected predetermined memory block. When the memory controller 110 erases the predetermined memory block by the SLC mode, the predetermined memory block is configured as an SLC memory block. Similarly, when the memory controller 110 erases the predetermined memory block by an MLC mode, the predetermined memory block is configured as an MLC memory block, and when the memory controller 110 erases the predetermined memory block by a TLC or QLC mode, the predetermined memory block is configured as a TLC or QLC memory block.

The invention may be applied in the data storage device using a single buffer or using multiple buffers (for example, using two buffers or more). In the single buffer's structure, the predetermined memory block selected as the cache memory may be configured as any type of memory block, such as any of the aforementioned SLC, MLC, TLC or QLC memory block, while in the multiple buffers' structure, the predetermined memory blocks selected as the cache memories may be configured as the same or different types of memory blocks. As an example, at least one of the predetermined memory blocks selected as the cache memories may be configured as the SLC memory block and at least another of the predetermined memory blocks selected as the cache memories may be configured as the non-SLC memory block, such as being configured as the aforementioned MLC, TLC or QLC memory block.

According to a first embodiment of the invention, when the host device 130 writes data into the memory device 120, the memory controller 110 may buffer the data corresponding to hot-write Sub-Regions in a specific memory block so as to gather them in the specific memory block. Since the data corresponding to hot-write Sub-Regions will be frequently updated, when the data gathered in the specific memory block all becomes invalid data, the specific memory block may be directly released as a free memory block in the spare region without the need of performing a garbage collection procedure on the specific memory block. In this manner, the access performance of the memory device may also be improved. For example, the memory controller 110 may determine the data flow before writing the data into the buffer, so that the data corresponding to hot-write Sub-Regions is written in a predetermined memory block while the remaining data is written in another predetermined memory block.

According to a second embodiment of the invention, the Sub-Regions may comprise one or more system data Sub-Regions and when the host device 130 writes data into the memory device 120, the memory controller 110 may buffer the data corresponding to the system data Sub-Regions in a specific memory block so as to gather them in the specific memory block. Since the data corresponding to system data Sub-Regions will be frequently updated, when the data gathered in the specific memory block all becomes invalid data, the specific memory block may be directly released as a free memory block in the spare region without the need of performing a garbage collection procedure on the specific memory block. In this manner, the access performance of the memory device may also be improved. For example, the memory controller 110 may determine the data flow before writing the data into the buffer, so that the data corresponding to system data Sub-Regions is written in a predetermined memory block while the remaining data is written in another predetermined memory block.

According to a third embodiment of the invention, when the host device 130 writes data into the memory device 120, the memory controller 110 may buffer the data corresponding to hot-write Sub-Regions and system data Sub-Regions in a specific memory block so as to gather them in the specific memory block. Since the data corresponding to hot-write Sub-Regions and system data Sub-Regions will be frequently updated, when the data gathered in the specific memory block all becomes invalid data, the specific memory block may be directly released as a free memory block in the spare region without the need of performing a garbage collection procedure on the specific memory block. In this manner, the access performance of the memory device may also be improved. For example, the memory controller 110 may determine the data flow before writing the data into the buffer, so that the data corresponding to hot-write Sub-Regions and the data corresponding to system data Sub-Regions are written in a predetermined memory block while the remaining data is written in another predetermined memory block.

In the embodiments of the invention, the data flow from the host device 130 to the memory device 120 is appropriately split, so that the data corresponding to the hot-write Sub-Regions and/or the data corresponding to the data corresponding to system data Sub-Regions is/are written in a predetermined memory block while the remaining data is written in another predetermined memory block. In this manner, the data correspondingly to the frequently updated Sub-Regions is gathered together in the same memory block for efficiently processing data stored in the memory device (e.g., when the data in the this memory block all becomes invalid data, it may be directly released as a free memory block without the need of performing a garbage collection procedure thereon), and the access performance of the memory device will be improved.

Figure 5:
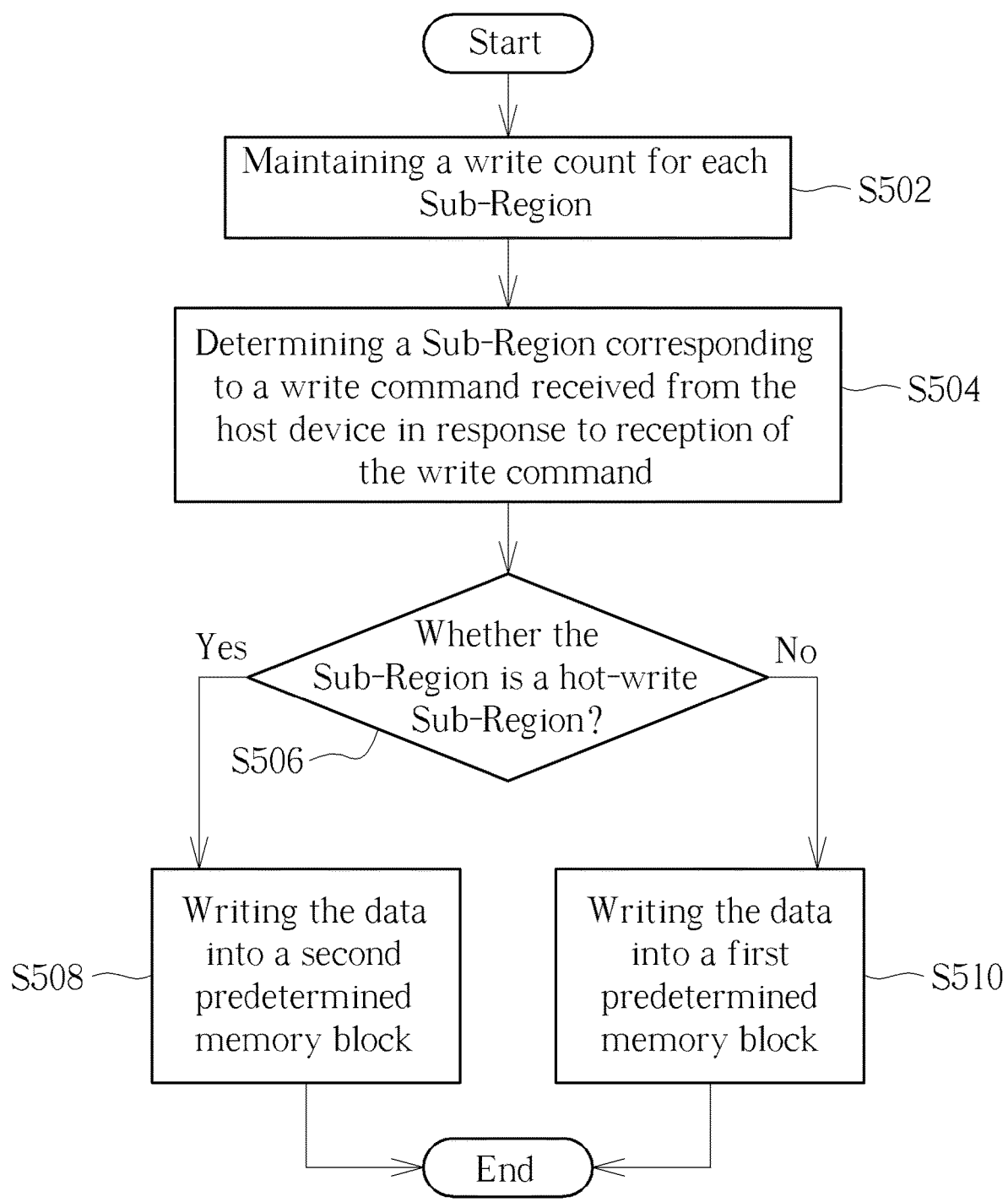
FIG. 5 shows an exemplary flow chart of a data processing method according to the first embodiment of the invention.

FIG. 5 shows an exemplary flow chart of a data processing method according to the first embodiment of the invention. The proposed data processing method is applicable for a data storage device, such as the data storage device 100, wherein the memory controller 110 may configure or use a first predetermined memory block as a buffer to receive data from the host device 130 and the data processing method may comprise the following steps performed by the memory controller 110:

Step S502: maintaining a write count W_Cnt for each Sub-Region, such as each of the aforementioned HPB Sub-Regions HPB_Sub_Rgn_0~HPB_Sub_Rgn_(L−1).

Step S504: in response to reception of a write command received from the host device 130 to write data corresponding to one or more logical addresses into the memory device 120, determining a Sub-Region corresponding to the write command according to the one or more logical addresses.

Step S506: determining whether the Sub-Region is a hot-write Sub-Region according to the write count corresponding to the Sub-Region and accordingly determining whether to use a second predetermined memory block as another buffer to receive the data from the host device. If the Sub-Region corresponding to the write command is determined as a hot-write Sub-Region, step S508 is performed. If the Sub-Region corresponding to the write command is determined not a hot-write Sub-Region, step S510 is performed.

Step S508: using a second predetermined memory block as another buffer and writing the data corresponding to the one or more logical addresses into the second predetermined memory block.

Step S510: writing the data corresponding to the one or more logical addresses into the first predetermined memory block.

It is to be noted that there may also be more than one Sub-Region corresponding to one write command. Therefore, in step S504, the Sub-Region determined according to the one or more logical addresses may be one or more Sub-Regions. In an embodiment of the invention, when there is more than one Sub-Region corresponding to the write command, when any of the Sub-Regions corresponding to the write command is determined as a hot-write Sub-Region in step S506, the memory controller 110 performs step S508. However, the invention is not limited thereto. In another embodiment of the invention, when there is more than one Sub-Region corresponding to the write command, the memory controller 110 performs step S508 only when all of the Sub-Regions are determined as a hot-write Sub-Region, or, the memory controller 110 performs step S508 only on the one or more Sub-Regions that is/are determined a hot-write Sub-Region, so as to write the data corresponding to the hot-write Sub-Regions in the second predetermined memory block, and performs step S510 on the Sub-Region(s) being determined as not a hot-write Sub-Region, so as to write the data corresponding to the non-hot-write Sub-Region(s) in the first predetermined memory block.

Generally, the write command carries a starting LBA and a data length to be written (hereinafter called the write length), therefore, in step S504, the memory controller 110 may derive the one or more logical addresses designated in the write command according to the starting LBA and write length, and derive which Sub-Region(s) the one or more logical addresses belong to according to the values or the indices of the one or more logical addresses, thereby determining the Sub-Region corresponding to the write command. Therefore, a range of logical addresses covered by the Sub-Region corresponding to the write command may comprise the one or more logical addresses designated in the write command, or, the one or more logical addresses designated in the write command may be comprised in the range of logical addresses covered by the Sub-Region corresponding to the write command. FIG. 2 shows the exemplary relationship between a logical address (e.g., the logical block address LBA) and a HPB Region/HPB Sub-Region. One of skilled in the art will understand how to derive which Region and which Sub-Region that a logical address belongs to, and details are omitted here for brevity.

According to an embodiment of the invention, the memory controller 110 may maintain a Sub-Region write count table Sub_Rgn_W_Cnt_Tab and update content of the Sub-Region write count table Sub_Rgn_W_Cnt_Tab in response to a write command issued by the host device 130. The Sub-Region write count table Sub_Rgn_W_Cnt_Tab may comprise a plurality of fields. Each field is configured to record the write count W_Cnt that is associated with one Sub-Region and the memory controller 110 may update the content of the Sub-Region write count table Sub_Rgn_W_Cnt_Tab by increasing the write count(s) W_Cnt associated with the Sub-Region(s) that logical addresses designated in the write command belong to.

To be more specific, in response to reception of a write command carrying a starting LBA and a write length, the memory controller 110 may update the content of the Sub-Region write count table Sub_Rgn_W_Cnt_Tab by increasing (e.g. +1 for each write) one or more write counts W_Cnt associated with the one or more Sub-Regions that the designated logical address(es) (such as the starting LBA and the subsequent LBA(s) derived from the starting LBA and the write length) belongs to. It is to be noted that, in response to one write command, the write count W_Cnt associated with one Sub-Region is increased by 1 at most.

According to another embodiment of the invention, the memory controller 110 may maintain a logic write count table LWC_Tab and update content of the logic write count table LWC_Tab in response to a write command issued by the host device 130. The logic write count table LWC_Tab may comprise a plurality of fields. Each field is configured to record a write count that is associated with a logical address, and the memory controller 110 may update the content of the logic write count table LWC_Tab by increasing the write count(s) associated with one or more logical addresses designated in the write command, and maintains the write count W_Cnt for each sub-region according to the content of the logic write count table LWC_Tab.

To be more specific, in response to reception of a write command carrying a starting LBA and a write length, the memory controller 110 may derive the logical addresses designated in the write command according to the starting LBA and the write length and update the content of the logic write count table LWC_Tab by increasing (e.g. +1 for each write) the write counts associated with the designated logical addresses, and sum up the write counts of all the logical addresses within the range of logical addresses covered by a Sub-Region to derive the write count W_Cnt associated with the Sub-Region.

According to an embodiment of the invention, the memory controller 110 may determine whether a Sub-Region corresponding to the write command is a hot-write Sub-Region by determining whether the write count W_Cnt associated with the Sub-Region is greater than a threshold. For example, besides maintaining a write count W_Cnt for each Sub-Region, the memory controller 110 may further calculate an average of the write counts associated with the Sub-Regions and set the average as the threshold. It is to be noted that since the write count W_Cnt associated with each Sub-Region is not a fixed value but a variable value that increases with the use of data storage device 100, the aforementioned average is not a fixed value, either, and the memory controller 110 may keep calculating the lasted average and set it as the aforementioned threshold.

In addition, the memory controller 110 may also calculate an average of the write counts W_Cnt associated with the Sub-Regions according to a total write bytes (TWB). As an example, the total write bytes TWB may be a summation obtained by accumulating the amount of data being written into the data storage device 100 in each write operation from a specific time point (for example, from the time when the data storage device 100 is loaded with the ISP code and initialized). Assuming that a capacity of the memory device 120 is 128 GB (bytes), but the total amount of written data is 256 GB, it will be readily appreciated that the average of the write counts per logical address is 2. Further assuming that the size of data corresponding to a logical address is 4 KB, and the capacity corresponding to a HPB Sub-Region is 24 MB, then it can be derived that the range of logical addresses covered by a HPB Sub-Region contains 24*1024/4=6144 logical addresses. Therefore, it can be deduced that the average write count of a HPB Sub-Region is 2*6144=12288, and the memory controller 110 may set the deduced number 12288 as the threshold for determining whether a Sub-Region is a hot-write Sub-Region.

According to another embodiment of the invention, the memory controller 110 may sort the write counts associated with all the Sub-Regions and determine whether the Sub-Region corresponding to the write command is a hot-write Sub-Regions or not according to the sorted write counts. For example, if the ranking of the write count W_Cnt associated with a Sub-Region among the sorted write counts that were sorted from most to least is less than a predetermined value, the memory controller 110 may determine that the Sub-Region is a hot-write Sub-Region.

In an embodiment of the invention, assuming that the capacity of a physical memory block (that is, a physical block) is 96 MB and the capacity corresponding to a HPB Sub-Region is 24 MB, it means that one physical memory block corresponds to four HPB Sub-Regions, and the memory controller 110 may determine that the Sub-Regions whose write count rankings belong to the top 4*N among all the sorted write counts are hot-write Sub-Regions, where the number 4 is the multiple of the capacity of a physical memory block relative to the capacity of a HPB Sub-Region and N is a positive integer. Therefore, in the embodiments of the invention, the memory controller 110 may set the threshold (that is, the aforementioned predetermined value) utilized for determining whether a Sub-Region is a hot-write Sub-Region according to the sorted write counts based on the relationship between the capacity of a physical memory block and the capacity of a HPB Sub-Region.

According to an embodiment of the invention, the second predetermined memory block (i.e., the aforementioned specific memory block) configured to buffer the data corresponding to the hot-write Sub-Region may be single-level cell (e.g., the SLC) memory block. According to another embodiment of the invention, the second predetermined memory block configured to buffer the data corresponding to the hot-write Sub-Region may be multiple-level cell (e.g., the MLC, TLC or QLC) memory block. In addition, in the embodiments of the invention, the first predetermined memory block and the second predetermined memory block may be configured as the same type of memory block. For example, the first predetermined memory block and the second predetermined memory block may both be configured as single-level cell memory blocks or both be configured as multiple-level cell memory blocks. The first predetermined memory block and the second predetermined memory block may also be configured as different types of memory blocks. For example, the first predetermined memory block may be configured as a multiple-level cell memory block while the second predetermined memory block may be configured as a single-level cell memory block. The invention is not limited to any particular combination.

For example, the memory controller 110 may configure the memory block for receiving the data corresponding to the hot-write Sub-Region as SLC memory block and configure the memory block for receiving other data as the multiple-level cell memory block. Since the speed of writing data into the SLC memory block is faster than that of writing data into the multiple-level cell memory block, configuring the SLC memory block as the buffer is benefit to speeding up the write operation of the memory device. In addition, since the data corresponding to hot-write Sub-Regions will be frequently updated, when the data gathered in the SLC memory block all becomes invalid data, the SLC memory block may be directly released as a free memory block in the spare region without the need of performing a garbage collection procedure on the SLC memory block. In this manner, the access performance of the memory device may also be improved.

It is to be noted that the invention is actually not limited thereto. As mentioned above, the memory controller 110 may also configure the memory block for receiving data corresponding to the hot-write Sub-Region as a multiple-level memory block, or configure the memory block for receiving data corresponding to other non-hot-write Sub-Region as the SLC memory block.

Besides the data corresponding to the hot-write Sub-Region, the memory controller 110 may also write the data corresponding to the system data Sub-Regions to a predetermined memory block while writing the remaining data in another predetermined memory block.

According to an embodiment of the invention, the memory controller 110 may classify the data written in the memory device 120 as management data of a file system and user data, where the management data of the file system is the management data of a file system utilized by the Operating System (OS) of the host device 130 and the management data of the file system may be a file system management table. The file system management table may comprise a plurality of fields for recording the management information of user data. As an example, one field of the file system management table may be utilized to record the file size of each user data and the range of logical addresses corresponding to each user data, wherein one file may correspond to one record. As another example, another field of the file system management table may be utilized to record which data corresponding to which logical addresses of the host system has already been written in the memory device 120 and which logical address of the host system has no corresponding data being written in the memory device 120. According to an embodiment of the invention, the aforementioned host system may refer to a system comprising the host device 130 or comprising the host device 130 and the data storage device 100, or, may refer to a system comprising the host device 130, the data storage device 100 and one or more peripheral devices of the host device 130.

Generally, every time when user data is updated, the host device 130 accordingly updates the management data of the file system, so that the information recorded in the file system management table is the latest management information. When content of any filed in the file system management table has to be updated, the memory controller 110 writes the latest file system management table in the memory device 120. In this manner, in response to the update of the user data, the content of the file system management table is frequently updated as well.

Therefore, in the second embodiment of the invention, when the host device 130 issues a write command to write data into the memory device 120, the memory controller 110 may determine the data flow before writing the data into the buffer, so that the data corresponding to system data Sub-Regions is written in a predetermined memory block while the remaining data is written in another predetermined memory block.

Figure 6:
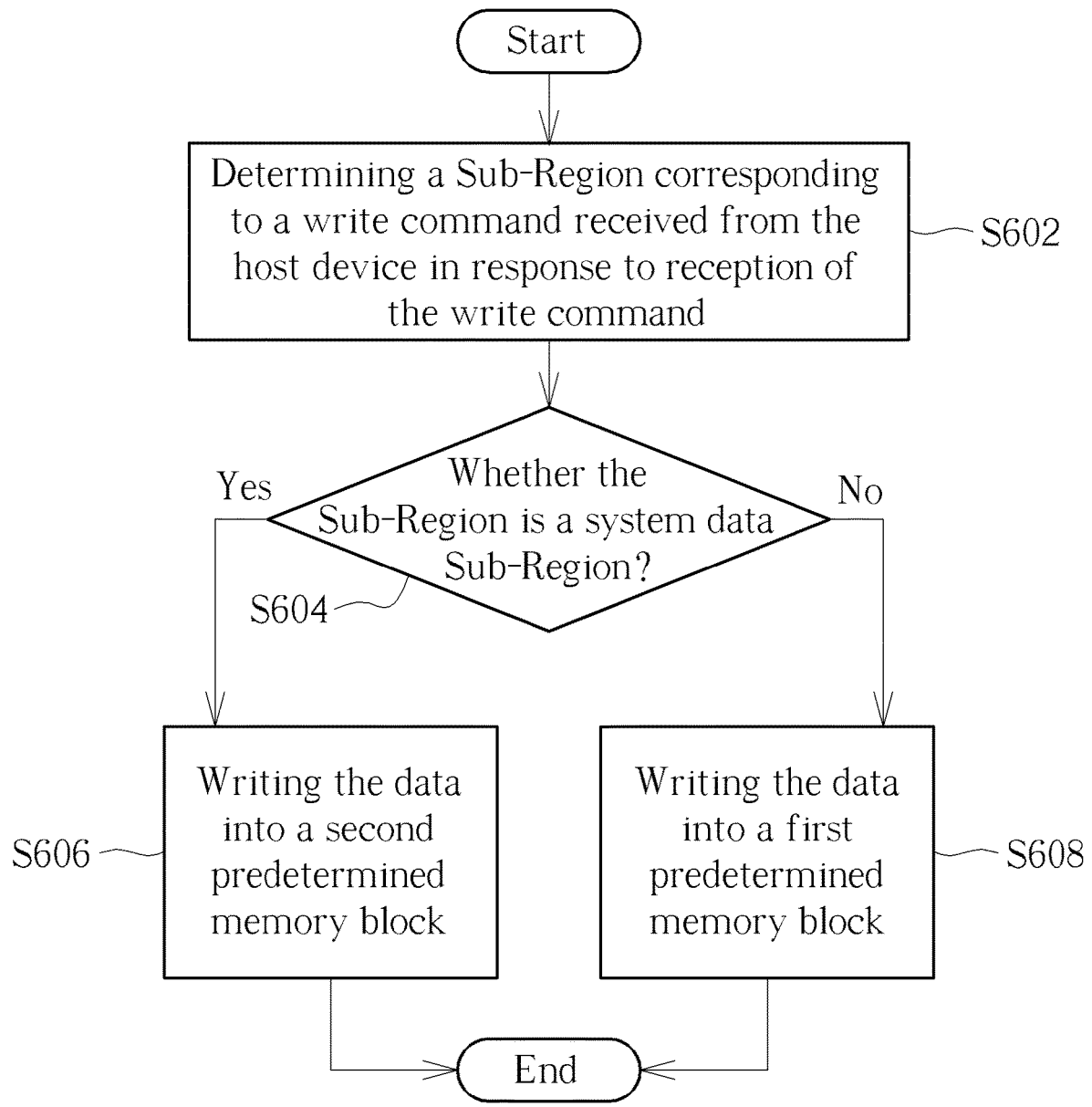
FIG. 6 shows an exemplary flow chart of a data processing method according to the second embodiment of the invention.

FIG. 6 shows an exemplary flow chart of a data processing method according to the second embodiment of the invention. The proposed data processing method is applicable for a data storage device, such as the data storage device 100, wherein the memory controller 110 may configure or use a first predetermined memory block as a buffer to receive data from the host device 130 and the data processing method may comprise the following steps performed by the memory controller 110:

Step S602: in response to reception of a write command received from the host device 130 to write data corresponding to one or more logical addresses into the memory device 120, determining a Sub-Region corresponding to the write command according to the one or more logical addresses.

Step S604: determining whether the Sub-Region corresponding to the write command is a system data Sub-Region (or, one of the one or more system data Sub-Regions) and accordingly determining whether to use a second predetermined memory block as another buffer to receive the data from the host device. If the Sub-Region corresponding to the write command is determined as a system data Sub-Region, step S606 is performed. If the Sub-Region corresponding to the write command is determined not a system data Sub-Region, step S608 is performed.

Step S606: using a second predetermined memory block as another buffer and writing the data corresponding to the one or more logical addresses into the second predetermined memory block.

Step S608: writing the data corresponding to the one or more logical addresses into the first predetermined memory block.

As described above, there may also be more than one Sub-Region corresponding to one write command. Therefore, in step S602, the Sub-Region determined according to the one or more logical addresses may be one or more Sub-Regions. In an embodiment of the invention, when there is more than one Sub-Region corresponding to the write command comprise, when any of the Sub-Regions corresponding to the write command is determined as a system data Sub-Region in step S604, the memory controller 110 performs step S606. However, the invention is not limited thereto. In another embodiment of the invention, when there is more than one Sub-Region corresponding to the write command, the memory controller 110 performs step S606 only when all of the Sub-Regions are determined as a system data Sub-Region, or, the memory controller 110 performs step S606 only on the one or more Sub-Regions that is/are determined a system data Sub-Region, so as to write the data corresponding to the system data Sub-Regions in the second predetermined memory block, and performs step S608 on the Sub-Region(s) determined as not a system data Sub-Region, so as to write the data corresponding to the non-system-data Sub-Region(s) in the first predetermined memory block.

In addition, in step S602, the memory controller 110 may derive the one or more logical addresses designated in the write command according to the starting LBA and write length, and derive which Sub-Region(s) the one or more logical addresses belong to according to the values or the indices of the one or more logical addresses, thereby determining the Sub-Region corresponding to the write command. Therefore, a range of logical addresses covered by the Sub-Region corresponding to the write command may comprise the one or more logical addresses designated in the write command, or, the one or more logical addresses designated in the write command may be comprised in the range of logical addresses covered by the Sub-Region corresponding to the write command. FIG. 2 shows the exemplary relationship between a logical address (e.g., the logical block address LBA) and a HPB Region/HPB Sub-Region. One of skilled in the art will understand how to derive which Region and which Sub-Region that a logical address belongs to, and details are omitted here for brevity.

In an embodiment, the host device 130 may assign the logical addresses having smaller values (e.g., from the beginning of the logical addresses) for storing the management data of file system. Therefore, the memory controller 110 may start to assign an index (for example, one of the HPB Sub-Region indices 0~(L−1) as shown in FIG. 2) to a corresponding Sub-Region, from the beginning of the logical addresses (for example, the LBA0 shown in FIG. 2), and when an index corresponding to the Sub-Region corresponding to the write command is smaller than a predetermined value (such as a first predetermined value), the Sub-Region corresponding to the write command is determined as a system data Sub-Region.

Assuming that the memory device 120 is a TLC flash memory, the capacity of one physical block is 72 MB and the capacity corresponding to a HPB Sub-Region is 24 MB, the predetermined value may be set to a value such as 3, 6, 9 . . . (that is, the integer multiple of the number of HPB Sub-Region comprised in a physical block). For example, if the memory controller 110 sets the HPB Sub-Regions with corresponding indices 0-2 as the system data Sub-Regions for storing the management data of the file system of the host device 130, the remaining HPB Sub-Regions may be regarded as being utilized to store user data and the predetermined value may be set to 3.

Similarly, assuming that the memory device 120 is a QLC flash memory, the capacity of one physical block is 96 MB and the capacity corresponding to a HPB Sub-Region is 24 MB, the predetermined value may be set to a value such as 4, 8, 12 . . . (that is, the integer multiple of the number of HPB Sub-Region comprised in a physical block). For example, if the memory controller 110 sets the HPB Sub-Regions with corresponding indices 0-3 as the system data Sub-Regions for storing the management data of the file system of the host device 130, the remaining HPB Sub-Regions may be regarded as being utilized to store user data and the predetermined value may be set to 4.

According to another embodiment of the invention, for the case when the host device 130 assigns the logical addresses having smaller values (e.g., assigning from the beginning of the logical addresses) to store the management data of the file system, when one of more values or indices corresponding to the one or more logical addresses designated in the write command are smaller than another predetermined value (such as a second predetermined value), the memory controller 110 may also determine that the Sub-Region corresponding to the write command is a system data Sub-Region.

It is to be noted that, in the embodiments of the invention, assigning the logical addresses having smaller values for storing the management data of the file system should not be a limit of the invention. As an example, the host device 130 may also assign the logical addresses having greater values (e.g., starting from the end of the logical addresses) for storing the management data of file system. Therefore, in the embodiments of the invention, the way to determine whether a Sub-Region is a system data Sub-Region or not may be flexibly adjusted according to the logical addresses assigned for storing the management data of file system, and the way to determine a system data Sub-Region introduced above should not be a limit of the invention.

For example, the host device 130 may set a specific range of logical addresses and assign the logical addresses within the specific range to a logical memory space for storing the management data of the file system. Therefore, in another embodiment of the invention, when a range of logical addresses covered by the Sub-Region corresponding to the write command overlap (which may be completely overlap or partially overlap) a range of the logical addresses configured by a host device for storing management data of the file system, the Sub-Region corresponding to the write command is determined as a system data Sub-Region.

For another example, when the one or more logical addresses designated in the write command indicates that the data that the host device attempts to write is management data of a file system of the host device, the Sub-Region corresponding to the write command is determined as a system data Sub-Region.

According to an embodiment of the invention, the host device 130 may notify the memory controller of the logical addresses or the range of logical addresses assigned for storing the management data of a file system in various ways. As described above, the memory controller 130 may communicate with the host device 130 via the host interface 118.

In addition, according to an embodiment of the invention, the management data of the file system is a file system management table.

According to an embodiment of the invention, the second predetermined memory block (i.e., the aforementioned specific memory block) configured to buffer the data corresponding to the system data Sub-Region may be single-level cell (e.g., the SLC) memory block. According to another embodiment of the invention, the second predetermined memory block configured to buffer the data corresponding to the system data Sub-Region may be multiple-level cell (e.g., the MLC, TLC or QLC) memory block. In addition, in the embodiments of the invention, the first predetermined memory block and the second predetermined memory block may be configured as the same type of memory block. For example, the first predetermined memory block and the second predetermined memory block may both be configured as single-level cell memory blocks or both be configured as multiple-level cell memory blocks. The first predetermined memory block and the second predetermined memory block may also be configured as different types of memory blocks. For example, the first predetermined memory block may be configured as a multiple-level cell memory block while the second predetermined memory block may be configured as a single-level cell memory block. The invention is not limited to any particular combination.

For example, since the management data of the file system comprises important information, the memory controller 110 may configure the memory block for receiving the data corresponding to the system data Sub-Region as SLC memory block to ensure the correctness of stored data, and configure the memory block for receiving other data as the multiple-level cell memory block. Since the speed of writing data into the SLC memory block is faster than that of writing data into the multiple-level cell memory block, configuring the SLC memory block as the buffer is also benefit to speed up the write operation of the memory device. In addition, since the data corresponding to system data Sub-Regions will be frequently updated, when the data gathered in the SLC memory block all becomes invalid data, the SLC memory block may be directly released as a free memory block in the spare region without the need of performing the garbage collection procedure. In this manner, the access performance of the memory device may also be improved.

It is to be noted that the invention is actually not limited thereto. As mentioned above, the memory controller 110 may also configure the memory block for receiving data corresponding to the system data Sub-Region as a multiple-level memory block, or configure the memory block for receiving other data (e.g., the user data) as the SLC memory block.

In the third embodiment of the invention, in response to a write command received from the host device 130 to write data corresponding to one or more logical addresses into the memory device 120, the memory controller 110 may determine a Sub-Region corresponding to the write command according to the one or more logical addresses, and further determine whether the Sub-Region corresponding to the write command is a hot-write Sub-Region according to the write count corresponding to the Sub-Region and determine whether the Sub-Region corresponding to the write command is a system data Sub-Region according to an index corresponding to the Sub-Region or according to one or more values or indices corresponding to the one or more addresses. When the Sub-Region corresponding to the write command is determined as a hot-write Sub-Region or a system data Sub-Region, a specific memory block will be utilized as a buffer to receive the data, and the data corresponding to the one or more addresses is gathered together in this specific memory block. If the Sub-Region corresponding to the write command is determined neither a hot-write Sub-Region nor a system data Sub-Region, a non-specific memory block will be utilized as another buffer, and the data corresponding to the one or more addresses is stored in the non-specific memory block.

As described above, in the embodiments of the invention, before writing the data into the buffer, the memory controller 110 may determine the data flow, so that the data flow is split for the data corresponding to hot-write and/or system data Sub-Regions being written in a predetermined memory block while the remaining data being written in another predetermined memory block. Since the data corresponding to hot-write Sub-Regions and/or system data Sub-Regions are gathered together in the same memory block, when the data gathered in the memory block all becomes invalid data, the memory controller may directly discard this memory block so that there is no need to perform a garbage collection procedure on this memory block, thereby saving the time and resource required for the garbage collection procedure as well as avoiding degrading access performance of the memory device due to frequently performing the garbage collection procedure, and the performance of the memory device can be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
a memory device, comprising a plurality of memory blocks, wherein the memory blocks correspond to a plurality of logical units, each logical unit corresponds to a plurality of logical addresses, the logical addresses corresponding to each logical unit are divided into a plurality of regions and each region is further divided into a plurality of sub-regions, and the sub-regions comprise one or more system data sub-regions; and a memory controller, coupled to the memory device and configured to access the memory device,
wherein the memory controller uses a first predetermined memory block as a buffer to receive data from a host device,
in response to a write command received from the host device to write data corresponding to one or more logical addresses into the memory device, the memory controller determines a sub-region corresponding to the write command according to the one or more logical addresses, determines whether the sub-region is one of the one or more system data sub-regions and accordingly determines whether to use a second predetermined memory block as another buffer to receive the data from the host device, and
wherein when the memory controller determines that the sub-region corresponding to the write command is one of the one or more system data sub-regions, the memory controller determines to use the second predetermined memory block as said another buffer and writes the data corresponding to the one or more logical addresses into the second predetermined memory block, and when the memory controller determines that the sub-region corresponding to the write command is not one of the one or more system data sub-regions, the memory controller writes the data corresponding to the one or more logical addresses into the first predetermined memory block.

2. The data storage device as claimed in claim 1, wherein the one or more logical addresses are comprised in a range of logical addresses covered by the sub-region corresponding to the write command.

3. The data storage device as claimed in claim 1, wherein when the one or more logical addresses indicates that the data that the host device attempts to write is management data of a file system of the host device, the sub-region corresponding to the write command is determined as one of the one or more system data sub-regions.

4. The data storage device as claimed in claim 1, wherein when an index corresponding to the sub-region corresponding to the write command is smaller than a first predetermined value or when one of more values corresponding to the one or more logical addresses are smaller than a second predetermined value, the sub-region corresponding to the write command is determined as one of the one or more system data sub-regions.

5. The data storage device as claimed in claim 1, wherein when the one or more logical addresses designated in the write command are in a range of logical addresses configured by a host device for storing management data of a file system, the sub-region corresponding to the write command is determined as one of the one or more system data sub-regions.

6. The data storage device as claimed in claim 1, wherein when a range of logical addresses covered by the sub-region corresponding to the write command overlap a range of logical addresses configured by a host device for storing management data of a file system, the sub-region corresponding to the write command is determined as one of the one or more system data sub-regions.

7. The data storage device as claimed in claim 6, wherein the management data of the file system is a file system management table.

8. A data processing method for a data storage device comprising a memory device and a memory controller, wherein the memory device comprises a plurality of memory blocks, the memory blocks correspond to a plurality of logical units, each logical unit corresponds to a plurality of logical addresses, the logical addresses corresponding to each logical unit are divided into a plurality of regions and each region is further divided into a plurality of sub-regions, the sub-regions comprise one or more system data sub-regions, the memory controller is coupled to the memory device and configured to access the memory device, the memory controller uses a first predetermined memory block as a buffer to receive data from a host device and the data processing method is performed by the memory controller and comprises:

in response to a write command received from the host device to write data corresponding to one or more logical addresses into the memory device, determining a sub-region corresponding to the write command according to the one or more logical addresses;

determining whether the sub-region is one of the one or more system data sub-regions and accordingly determining whether to use a second predetermined memory block as another buffer to receive the data from the host device; and using the second predetermined memory block as said another buffer and writing the data corresponding to the one or more logical addresses into the second predetermined memory block when the sub-region corresponding to the write command is determined as one of the one or more system data sub-regions, and writing the data corresponding to the one or more logical addresses into the first predetermined memory block when the sub-region corresponding to the write command is determined not one of the one or more system data sub-regions.

9. The data processing method as claimed in claim 8, wherein the one or more logical addresses are comprised in a range of logical addresses covered by the sub-region corresponding to the write command.

10. The data processing method as claimed in claim 8, wherein when the one or more logical addresses indicates that the data that the host device attempts to write is management data of a file system of the host device, the sub-region corresponding to the write command is determined as one of the one or more system data sub-regions.

11. The data processing method as claimed in claim 8, wherein when an index corresponding to the sub-region corresponding to the write command is smaller than a first predetermined value or when one of more values corresponding to the one or more logical addresses are smaller than a second predetermined value, the sub-region corresponding to the write command is determined as one of the one or more system data sub-regions.

12. The data processing method as claimed in claim 8, wherein when the one or more logical addresses designated in the write command are in a range of logical addresses configured by the host device for storing management data of a file system, the sub-region corresponding to the write command is determined as one of the one or more system data sub-regions.

13. The data processing method as claimed in claim 8, when a range of logical addresses covered by the sub-region corresponding to the write command overlap a range of logical addresses configured by the host device for storing management data of a file system, the sub-region corresponding to the write command is determined as one of the one or more system data sub-regions.

14. The data processing method as claimed in claim 13, wherein the management data of the file system is a file system management table.

\* \* \* \* \*